June 23, 1931.  J. M. ERICKSON  1,811,310
UNLOADING DEVICE FOR BUCK RAKES
Filed April 19, 1929  2 Sheets-Sheet 1
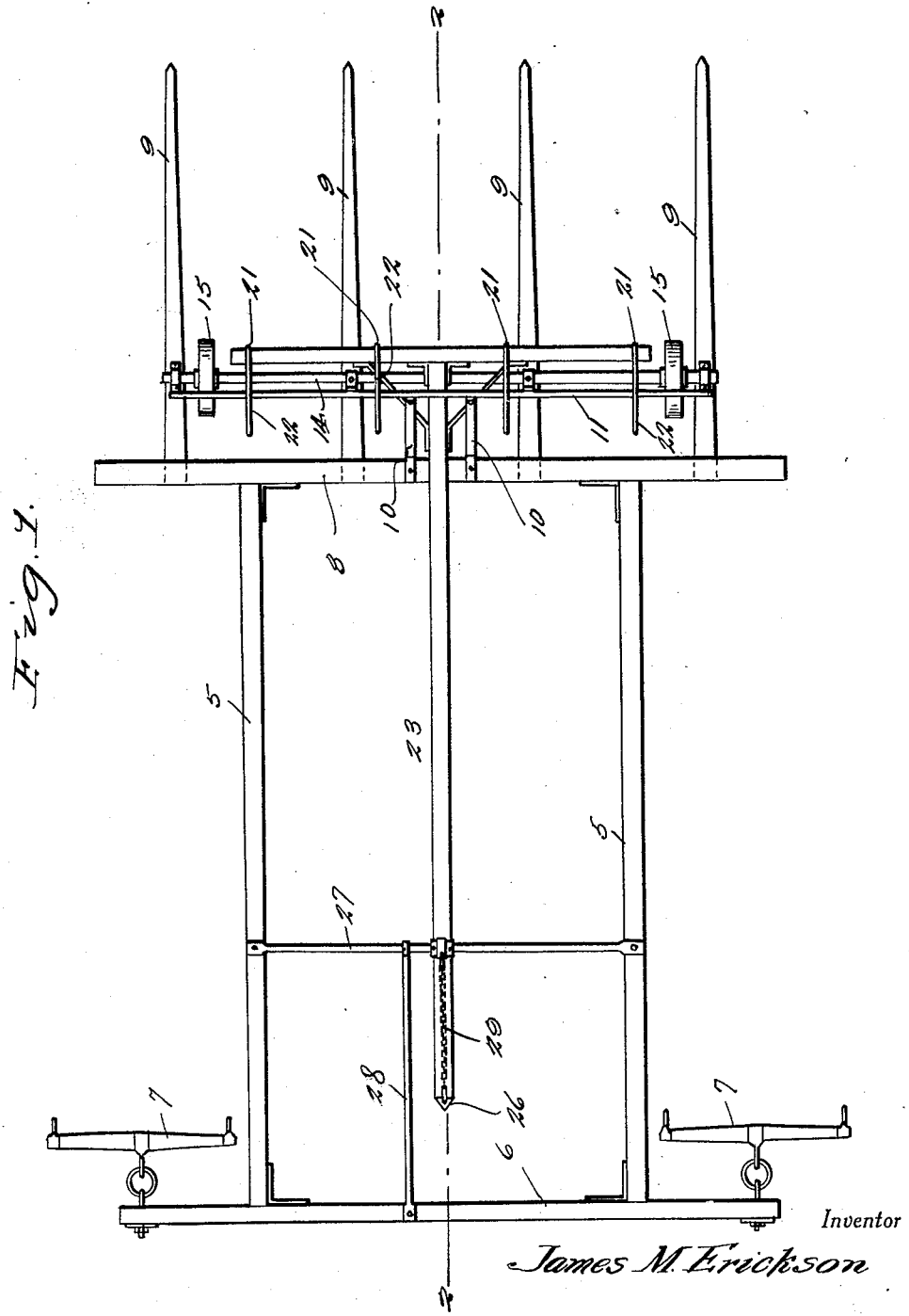
Inventor
*James M. Erickson*
By *Clarence A. O'Brien*
Attorney June 23, 1931. J. M. ERICKSON 1,811,310
UNLOADING DEVICE FOR BUCK RAKES
Filed April 19, 1929 2 Sheets-Sheet 2
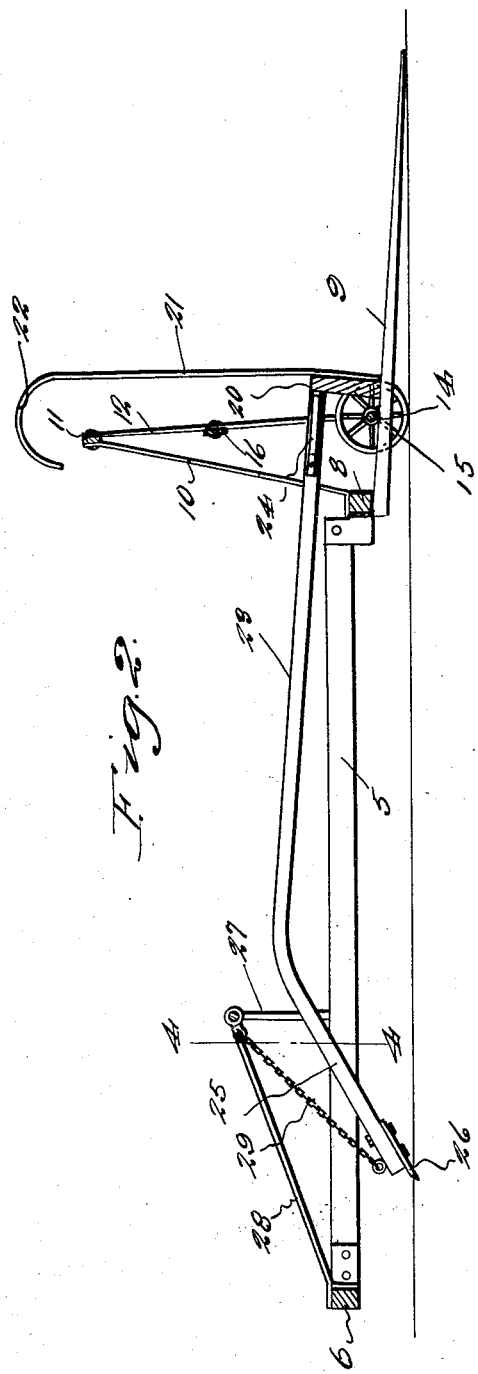
Inventor
James M. Erickson
By Clarence A. O'Brien
Attorney Patented June 23, 1931

1,811,310

UNITED STATES PATENT OFFICE

JAMES M. ERICKSON, OF GLASGOW, MONTANA

UNLOADING DEVICE FOR BUCK RAKES

Application filed April 19, 1929. Serial No. 356,432.

The present invention relates to an unloading device for buck rakes and has for its prime object to provide a member slidable over the buck rake so as to unload alfalfa and the like therefrom.

Another important object of the invention resides in the provision of a device of this nature which is exceedingly simple in its construction, inexpensive to manufacture and install, easy to manipulate, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a top plan view of a buck rake embodying the features of my invention, Figure 2 is a vertical longitudinal section therethrough taken substantially on the line 2—2 of Figure 1, Figure 3 is a front elevation of the pusher, and Figure 4 is a detail transverse vertical section taken substantially on the line 4—4 of Figure 2.

Referring to the drawings in detail it will be seen that the frame of the buck rake disclosed herein comprises side bars 5 connected to rear cross bar 6 extending beyond the side bars 5 and having whiffle trees 7 attached thereto in any suitable manner.

The front ends of the bars 5 are connected to front cross bar 8 which extends beyond the side bar and has the forwardly extending downwardly inclined tines 9 attached thereto. Rods 10 rise from the central portion of the cross bar 8 and incline slightly forwardly and are attached to a cross horizontal bar 11 from which depends rods 12 on the extremities of which are mounted axle 14 on which wheels 15 are journaled, preferably immediately inside of the outermost tines 9. The rods 12 are connected by a cross brace 16. The parts thus far described are conventional and have been illustrated merely for the purposes of exemplifying the utility and advantages of my improved structure.

I provide a pusher comprising a board 20 to slide along the tines 9 this board being disposed in a plane across the tines at approximately right angles thereto and has a plurality of spring fingers 21 rising therefrom and curved over rearwardly at their upper end as is indicated at 22.

A beam 23 is secured to the upper central portion of the board 20 and braced in respect thereto as at 24. This beam extends rearwardly inclining slightly upwardly and rearwardly and merges into a downwardly and rearwardly inclined extension 25 on the extremity of which is a spade 26. An upwardly bowed bar 27 is mounted with its ends secured to the rear portion of the side bars 5 and is braced by a rod 28 in respect to the cross bar 6. A chain 29 is secured to the center of the rod 27 and to the rear lower extremity of the extension 25 of the beam 23.

When the buck rake is moved forwardly in the usual well known manner, the alfalfa or the like will pile on the tines 9 against the pusher and when the buck rake is stopped and backed up the spade 26 digs in the ground causing the beam 23 to stop and the pusher to remain stationary as the tines 9 back up thereby pushing the alfalfa or the like off of the tines on to the ground in a stack or pile.

It is thought that the construction, operation, utility and advantages of this invention will now be quite apparent to those skilled in this art. The present embodiment of this invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described by invention, what I claim as new is:

In a buck rake, a front cross bar, a plurality of forwardly extending tines connected with said cross bar, a pair of spaced parallel rearwardly extending side bars connected to the front bar, a rear cross bar connected to the rear ends of the side bars and extending beyond the opposite faces of said side bars, a bowed cross rod connecting the side bars together intermediate the ends thereof, a transversely extending pusher board slidable on the tines, a rearwardly extending beam secured to the pusher board and arranged intermediate the side bars having a downwardly and rearwardly inclined terminal, a spade carried by the extreme lower end of said terminal, a flexible connection between the terminal and the bowed cross rod, and a plurality of upwardly extending spring fingers secured to the pusher board having depending rearwardly extending arcuate upper ends, as and for the purpose specified.

In testimony whereof I affix my signature.

JAMES M. ERICKSON.